June 15, 1926.
C. C. VAN NUYS
1,588,860
METHOD OF PRODUCING HYDROGEN
Filed August 2, 1921
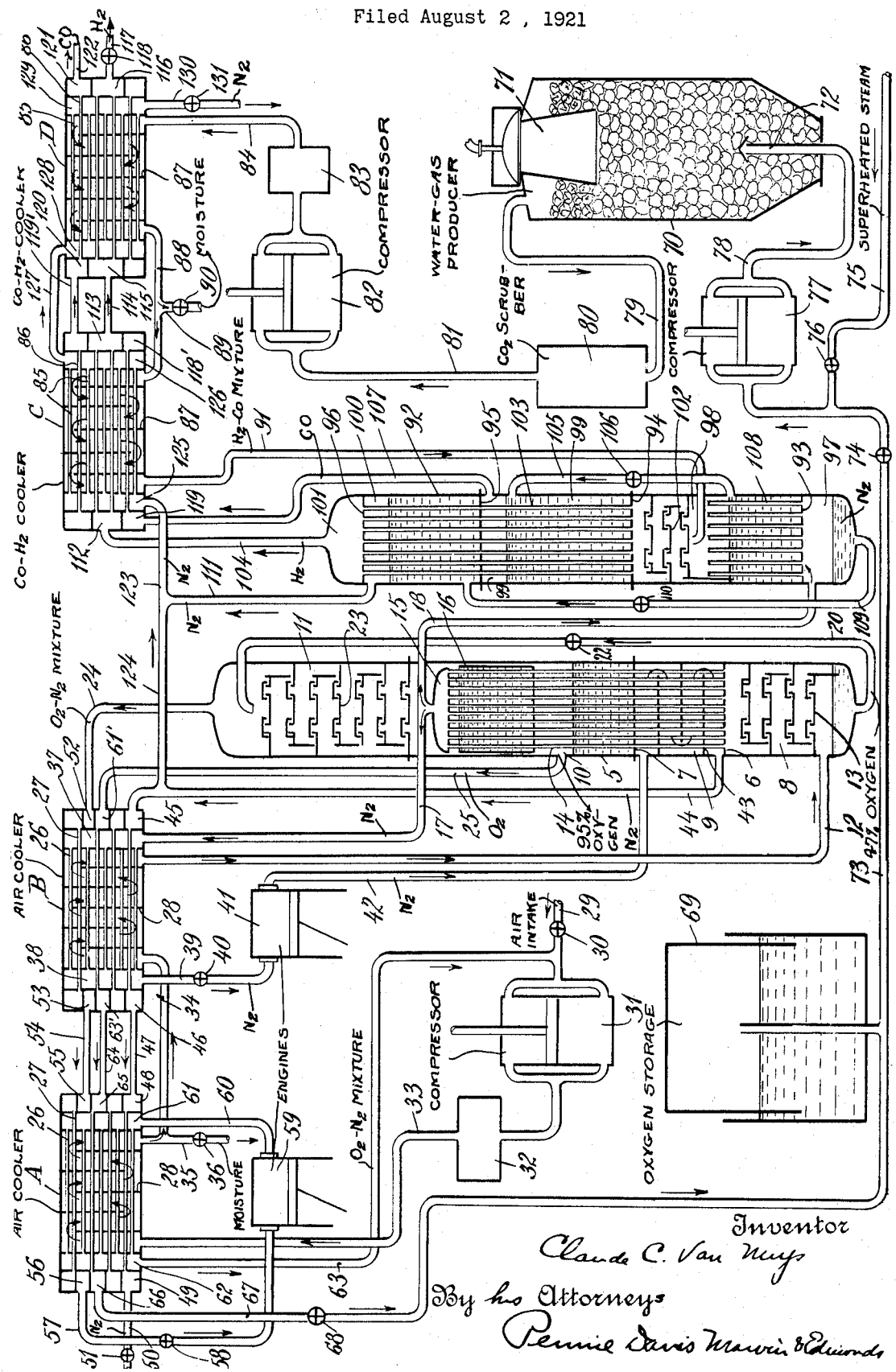
Inventor
Claude C. Van Nuys
By his Attorneys
Pennie Davis Marvin & Edmonds Patented June 15, 1926.

1,588,860

UNITED STATES PATENT OFFICE.

CLAUDE C. VAN NUYS, OF CRANFORD, NEW JERSEY, ASSIGNOR TO AIR REDUCTION COMPANY, INCORPORATED, A CORPORATION OF NEW YORK.

METHOD OF PRODUCING HYDROGEN.

Application filed August 2, 1921. Serial No. 489,318.

This invention relates to the production of hydrogen in relatively large quantities and at a low cost. The invention involves the operation of a suitable gas producer by injecting a mixture of superheated steam with oxygen of relatively high purity, e. g., 95%, and utilizing the excess refrigerative effect of the refrigeration cycle employed in producing oxygen from the atmosphere for the purpose of separating hydrogen from water gas. By producing oxygen as hereinafter described by liquefaction, it is possible to provide an excess of refrigeration which may be utilized to separate hydrogen from water gas without substantial loss, and consequently in a commercially efficient and practicable manner. The hydrogen is thus available at the lowest possible cost, and may be utilized for many purposes for which it has not previously been available.

It has been suggested, heretofore, to utilize oxygen in water gas producers, but so far as is known, no commercial advantage has been taken of this suggestion. It has also been suggested to separate hydrogen from water gas by liquefaction methods, but the suggested methods are inefficient and therefore of relatively slight commercial value. There has been no method heretofore which can be operated economically to produce hydrogen in large quantities, nor has it been recognized that in combining the suggested use of oxygen in the water gas producer with the subsequent separation of hydrogen by liquefaction, an economically practicable recovery of hydrogen can be accomplished. In combining the suggested improvements with the additional feature of producing excess refrigeration in the oxygen cycle and utilizing it in separating the water gas, the present invention has accomplished the object of producing hydrogen inexpensively, and, as will more fully hereinafter appear, the method developed has great commercial possibilities and represents a substantial advance in the art.

It will be noted that in a water gas producer two chemical reactions are employed. The first reaction, $C+H_2O=CO+H_2$, is the well-known water gas reaction involving the decomposition of water to produce a mixture of hydrogen and carbon monoxide. This reaction is endothermic, i. e., heat is absorbed in the reaction. The heat is supplied as far as possible by means of the oxidation of carbon to carbon monoxide according to the reaction $C+O=CO$. The oxygen required for this reaction is supplied by the introduction of a sufficient volume of air with the result that the producer gas is ordinarily diluted with a large proportion of nitrogen. Obviously, the use of oxygen of comparative purity in place of air is preferable since the diluting nitrogen is eliminated. The problem of producing oxygen at a sufficiently low cost to permit of its utilization in the gas producer has heretofore prevented such use. The present commercial methods of producing oxygen are much too costly, and it is necessary, therefore, to utilize a more efficient method for separating oxygen from the atmosphere, so that the oxygen may be economically employed in the producer. Fortunately, such a method has been discovered, and moreover, it is found that the excess refrigerative effect available in this method is sufficient to permit the liquefaction and consequent separation from the hydrogen of substantially all of the constituents of the water gas. The hydrogen is thus obtained in a relatively pure condition. It is, moreover, possible by reason of the utilization of oxygen in place of atmospheric air, as an oxidizing agent in the producer, to operate the latter continuously instead of intermittently. While continuous operation is possible in practicing the method, it may be advisable, in order that the proportion of hydrogen in the producer gas may be increased, to operate intermittently as heretofore, it being borne in mind that in any event a proportion of steam hould be mixed with the oxygen in order to prevent the attainment of temperatures which would disastrously affect the structure of the gas producer.

To obtain one volume of hydrogen by the water gas reaction, it is necessary to supply one volume of water vapor, and from this we obtain one volume of carbon monoxide in addition to the hydrogen. The heat of formation of water vapor from its elements from and at 15° C. equals 58,060 calories per gram molecule. The heat of formation of carbon monoxide under like conditions equals 29,160 calories per gram molecule. Hence when water vapor is decomposed according to the water gas reaction, the net quantity of heat which must be supplied is $$58,060 - 29,160 = 28,900$$

calories per gram molecule. This heat is to be supplied as far as possible by means of the reaction $C+O=CO$, which furnishes 29,160 calories per gram molecule. Hence in round numbers, to obtain one volume of hydrogen we must supply one volume of water vapor and one-half volume of oxygen, and from this we obtain two volumes of carbon monoxide and one volume of hydrogen. That is to say, the composition of the water gas would be in the neighborhood of 33⅓% of hydrogen if no nitrogen were introduced with the oxidizing agent. To produce the required amount of oxygen, it would be necessary to separate at least two and one half volumes of air. Probably considerably more oxygen than indicated would be required to carry on the reaction continuously, although this excess could be reduced by superheated steam, and by heat furnished by oxidizing carbon to carbon dioxide to the extent to which the latter is inevitably present in the water gas produced. It is found that by operating an air liquefaction cycle of the character hereinafter described at an initial pressure of 40 to 50 atmospheres to produce the requisite oxygen, there is enough excess refrigerative effect available if applied in the manner herein described to separate by liquefaction the water gas produced when the oxygen is utilized in the producer.

In general, the invention involves the treatment of a sufficient volume of air after compression and refrigeration thereof by selective liquefaction and subsequent rectification to separate a residual unliquefied gas, namely nitrogen, at substantially the initial pressure, substantially pure oxygen which is utilized in the gas producer, and a gaseous effluent having substantially air composition which is returned for further separation in the cycle. The first separation of the nitrogen is accomplished in a "backward return" tubular condenser by indirect contact first with a cold gaseous medium and then with liquid products of the operation accumulating about the tubes of the condenser. The nitrogen leaving the top of the condenser at a low temperature is divided into two portions, one of which is returned in indirect contact in a suitable exchanger with the incoming gaseous mixture. After being thus warmed, the high pressure nitrogen is expanded in a suitable engine or turbine, and the cold product of the expansion is employed as the first cooling agent for the gaseous mixture passing through the tubular condenser. The cold nitrogen is then returned to the exchanger where it is warmed by indirect contact with the incoming gaseous mixture, a portion of the nitrogen being withdrawn prior to its entrance to the exchanger and utilized in another exchanger where it serves to cool the water gas prior to separation thereof in the manner hereinafter described. The other portion of the nitrogen escaping from the tubular condenser is delivered to the column wherein the water gas is separated and is utilized therein in the manner hereinafter described.

The liquid produced by the separation in the tubular condenser is delivered to the upper part of a rectification chamber arranged above the tubular condenser and is there subjected to vapors arising from the accumulated oxygen-enriched liquid. Further separation is accomplished in which the liquid is enriched in oxygen with coincident separation of nitrogen accompanied by a proportion of oxygen, the gases being mixed in proportions to provide a composition in phase equilibrium with the liquid delivered to the rectification chamber. The gaseous mixture or effluent escaping from the top of the rectification chamber is cold and is still at a substantial pressure. It is warmed by indirect contact with the incoming gaseous mixture and if produced in sufficient volume, it is expanded in a suitable engine or turbine to substantially atmospheric pressure. The cold product of the expansion is utilized in cooling the incoming mixture and the effluent is thereafter delivered to the inlet to the compressor, where it mixes with the incoming air and is compressed therewith. Obviously, since the effluent has already passed through the cycle, it is free from carbon dioxide and moisture, and the necessary purification of the incoming air is eliminated to the extent that the effluent forms a proportion of the mixture passing to the tubular condenser.

The oxygen liquid which results from the rectification is vaporized and the vapor being cold, is utilized as a cooling medium for the incoming mixture in the exchanger. It is thereafter delivered to a suitable storage receptacle such as a gasometer where it is stored until needed. The oxygen is withdrawn from the gasometer and mixed with a suitable proportion of superheated steam, the essential proportions depending upon the particular mode of operation of the gas producer. After compression, the mixture of oxygen and steam is delivered to the producer either continuously or alternately with a mixture containing a materially higher proportion of oxygen which causes an increased temperature in the producer. If the producer is operated continuously, water gas of the requisite composition is withdrawn continuously therefrom. If the producer is operated intermittently, the gas resulting from blowing with a high proportion of oxygen is withdrawn and utilized for heating or other purposes independently of the gas which is used for the production of hydrogen.

The gas of suitable hydrogen content is compressed and delivered to a suitable exchanger where it is cooled by indirect contact with cold products of the separation and with additional cold products from the air liquefaction cycle which served to maintain the necessary refrigeration for the accomplishment of the desired object. After cooling, the water gas is delivered to a "backward return" condenser and travels through the tube thereof in indirect contact with liquid cooling media, the first of which is the liquid produced by selective liquefaction of the water gas in the tubes and consists principally of carbon monoxide. The second cooling medium is liquid nitrogen. This liquid nitrogen is formed from a portion of the nitrogen hereinbefore referred to, which is withdrawn from the "backward return" condenser of the air liquefaction cycle. The cold nitrogen is subjected to indirect contact in a tubular condenser with the cold carbon monoxide produced as a result of selective liquefaction of the water gas mixture, and as accumulated, it is delivered to a chamber surrounding the upper portion of the tubular condenser for the water gas.

As a result of selective liquefaction in the tubes, substantially pure hydrogen in a gaseous condition is delivered from the condenser, and after being warmed by indirect contact with the incoming water gas mixture, it may be delivered to a suitable receptacle for storage. The liquid carbon monoxide is vaporized and the vapor is similarly warmed by indirect contact with the incoming water gas mixture and may be delivered to a suitable storage receptacle.

If no external refrigeration were provided in the water gas cycle, the inleakage of heat would eventually raise the temperature thereof to a point which would prevent the continuation of the desired separation. To prevent this contingency, cold nitrogen is withdrawn as previously indicated from the gas leaving the air cycle and is utilized in a suitable exchanger to refrigerate the incoming water gas mixture. Moreover, cold nitrogen from the air cycle is liquefield in the water gas cycle and utilized therein for the final refrigeration of the water gas mixture, and an additional refrigerative effect is thereby supplied to the water gas cycle. Continued operation of the water gas cycle is thus assured. Moreover, by utilizing a cold liquid as the final refrigerative medium in the water gas cycle, the final temperature to which the water gas mixture is subjected may be readily controlled and is not subject to variations which would otherwise effect it if a gaseous medium were employed for this purpose. The principal object and advantages of the invention will be sufficiently clear from the foregoing description, and other objects and advantages will be apparent as the invention is better understood by reference to the following statement of a particular mode of application of the invention and to the accompanying drawing which diagrammatically illustrates an apparatus adapted for such application. It is to be understood that details of the apparatus which may be readily supplied by those skilled in the art have not been illustrated in the drawing, the purpose thereof being to assist in the understanding of the essentials of the method and apparatus as hereinafter described.

Referring to the drawing, 5 indicates a column wherein the oxygen, which is essential to the operation of the method, is produced. The column is divided by partitions 6 and 7 into compartments 8, 9 and 10, and a rectifying compartment 11 is disposed above the compartment 10 for the final separation of the constituents as hereinafter described. The air, after compression and cooling thereof, is delivered through a pipe 12 to the compartment 8 which contains a plurality of trays 13, of the usual form and adapted to support layers of liquid through which the entering air passes. The purpose of these trays is to impoverish the liquid descending thereover in the more volatile constituents of the air, namely nitrogen, and to thus produce a liquid having a maximum enrichment in the less volatile constituent, namely oxygen, which accumulates in the bottom of the compartment.

The liquid descending over the trays 13 is produced in a plurality of tubes 14, extending through the partitions 6 and 7 to a head 15 disposed directly beneath the rectifying compartment. In passing through the tubes, the cold compressed air is subjected to indirect contact, first with a cold gaseous medium in the compartment 9 and then to liquid accumulating in the compartment 10 and in a receptacle 16 arranged in the compartment. The air is subjected to selective liquefaction, and the liquid produced returns in the tubes in direct contact with the incoming gaseous mixture with the result that the descending liquid increases in oxygen content under the principle of "backward return", while the ascending gaseous mixture is continually enriched in nitrogen until it reaches the head 15 from which nitrogen in a substantially pure condition is withdrawn through the pipes 17 and 18.

The liquid accumulating in the bottom of the compartment 8 is delivered through a pipe 20 having a pressure reducing valve 22 to the top of the rectifying compartment. This compartment contains a plurality of trays 23 of the usual form, over which the liquid descends as the vapor from the compartment 10 and the receptacle 16 rises therethrough. There results a rectification in accordance with well-known principles, the liquid being enriched in oxygen until it finally descends to the compartment 10 with a composition of substantially 95% oxygen. An effluent of substantial air composition is withdrawn through a pipe 24 from the top of the rectifying compartment. The liquid evaporating in the compartment 10 is a result of the transfer of cold through the tubes 14. The gaseous mixture therein is withdrawn through a pipe 25 from that compartment.

It will be noted that in the primary selective liquefaction of the air entering the column, a liquid approaching a composition of 47% oxygen is produced and this liquid is subsequently rectified to eliminate the greater proportion of nitrogen therefrom. The unliquefied residual gas leaving the tubes 14 is substantially pure nitrogen, and this gas is withdrawn from the column at substantially the initial pressure of the air, and is consequently available for expansion and recovery of energy as well as for the development of a refrigerative effect which may be utilized in continuing the operation. The effluent escaping through the pipe 24 is at a somewhat lower pressure, owing to the release of pressure on the liquid passing the valve 22, but the effluent is also available for expansion and the production of a refrigerative effect. The residual nitrogen, the oxygen escaping through the pipe 25 and the effluent escaping through the pipe 24 are each at a very low temperature, and are, therefore, available directly as cooling agents for the incoming air.

To accomplish this cooling, an exchanger is provided, preferably comprising two sections A and B, each consisting of a shell and enclosing a plurality of tubes 26 and 27 and baffles 28 to direct the incoming air about the tubes. The air is introduced through an inlet 29, controlled by a valve 30 to a suitable compressor 31, where the pressure is increased to the desired point. After cooling in a suitable aftercooler 32, which may be supplied with water, the compressed air is delivered by a pipe 33 to the section A of the exchanger and circulates about the baffles 28 therein. A pipe 34 delivers the partially cooled air to the section B of the exchanger, and after circulating about the baffles therein the air is delivered to the pipe 12 which conveys it to the column 5. A drip line 35 provided with a valve 36 is connected to the pipe 34 to permit the withdrawal of moisture condensed in the section A of the exchanger.

Nitrogen is delivered by the pipe 17 to a chamber 37 at one end of the section B of the exchanger and passes through the tubes 26 to a chamber 38 at the opposite end of that section, and is thus warmed by heat interchange with the incoming air circulating about the tubes. The warm nitrogen is delivered through a pipe 39 controlled by a valve 40 to an expansion engine or turbine 41 where the nitrogen is expanded with external work and thereby cooled. The cold expanded nitrogen is delivered through a pipe 42 to the chamber 9 of the column and is caused to circulate therein about the tubes 14 by baffles 43 provided in the chamber. The cold nitrogen is thus caused to serve as a refrigerating and liquefying agent for the gaseous mixture traveling through the tubes 14, and after serving this purpose, it leaves the chamber by a pipe 44 and is conveyed to a chamber 45 at the end of the section B of the exchanger. Thence it passes through tubes 27 to a chamber 46 at the opposite end of the section B and is delivered through a pipe 47 to a chamber 48 at one end of the section A of the exchanger. Thence the gas passes through tubes 27 to a chamber 49 at the opposite end of the section A and is withdrawn through a pipe 50 controlled by a valve 51. The warm nitrogen at substantially atmospheric pressure may be delivered to the atmosphere or conveyed to a suitable container therefor where it may be preserved for any suitable use.

The effluent escaping through the pipe 24 from the column 5 is delivered to a chamber 52 at the end of the section B of the exchanger and passes thence through tubes 27 to a chamber 53 at the opposite end of the section B. A pipe 54 conveys the gas to a chamber 55 at one end of the section A of the exchanger whence the gas passes through tubes 27 to a chamber 56 at the opposite end of the section A. The gas is withdrawn to a pipe 57 controlled by a valve 58 and is delivered to an expansion engine or turbine 59 where it is expanded with external work and thereby cooled. The cold expanded gas is delivered by a pipe 60 to a chamber 61 at one end of the section A of the exchanger and passes through tubes 26 to a chamber 62 at the opposite end of the section A. From this chamber, the expanded gas is conveyed by a pipe 63 to the pipe 29 where it joins the incoming air going to the compressor 31. Thus the unseparated gas in the effluent which, as previously noted, has a composition closely approximating that of the atmosphere, is returned to the cycle and the necessity of removing carbon dioxide and moisture from an equivalent quantity of air is avoided.

The oxygen delivered from the column 5 through the pipe 25 is conveyed to a chamber 61' at one end of the section B of the exchanger and travels through tubes 27 to a chamber 63' at the opposite end of the section B. A pipe 64 conveys the gas to a chamber 65 at one end of the section A of the exchanger and the gas is delivered through tubes 27 to a chamber 66 at the opposite end of the section A. The oxygen is withdrawn from the exchanger after being warmed therein through a pipe 67 controlled by a valve 68 and is delivered thereby to a gasometer or other suitable holder 69 where it is stored for use in the producer.

A producer 70 of any suitable form and preferably constructed in accordance with well understood principles is provided with feeding means 71, and a distributor 72 for delivering a mixture of oxygen and superheated steam to the incandescent fuel contained therein. The oxygen is withdrawn from the gasometer 69 to a pipe 73 controlled by a valve 74 and is supplied with steam from any suitable source, and preferably superheated in the usual manner, by a pipe 75 controlled by a valve 76. The mixture of oxygen and steam is delivered to the producer by a suitable blower 77 through a pipe 78 which is connected to the distributor 72. The producer may be operated continuously, that is to say, a proper mixture of oxygen and steam in suitable proportions may be continuously delivered to the producer, or the proportions of air and steam may be varied from time to time to alternate the temperature raising operation in which the proportion of oxygen predominates and a lean gas is produced with the producing operation, in which case a gas of the desired composition is produced. The lean gas may be separately delivered from the producer and utilized for any suitable purpose.

When a gas of suitable composition for separation in accordance with the invention is produced, it is delivered through a pipe 79 to a scrubber 80 of the usual type in which carbon dioxide is removed. From the scrubber, the gas is delivered through a pipe 81 to a compressor 82 where its pressure is raised. The heat of compression is removed in an after-cooler 83, preferably supplied with water, and the gas is delivered through a pipe 84 to an exchanger comprising sections C and D, each consisting of a shell enclosing tubes 85 and 86 and provided with baffles 87 to cause the gas to circulate about the tubes. A pipe 88 connects the section D with the section C of the exchanger, and a drip line 89 provided with a valve 90 is provided to permit the removal of any condensate leaving the section D. From the section C of the exchanger, the cold gas is withdrawn through a pipe 91 and delivered to a column 92.

The column 92 comprises a shell provided with partitions 93, 94, 95 and 96, forming compartments 97, 98, 99, 100 and 101, the several functions of which will hereinafter more fully appear. The gas entering the column through the pipe 91 is delivered to the chamber 98 and passes therein to a plurality of trays 102 of the usual form and adapted to support layers of liquid. The function of the trays is to cause a partial rectification and separation of the most volatile constituent, i. e., hydrogen, from the liquid desending thereover. The gas then passes upwardly through a plurality of tubes 103, first in indirect contact with a body of liquid consisting of liquefied portions of the gas previously passing through the tubes and then in indirect contact with an extraneous liquid produced in the manner hereinafter described. A selective liquefaction of the gaseous mixture occurs in the tubes and the liquid descends therein in direct contact with the incoming gaseous mixture with consequent enrichment of the liquid in the less volatile constituents of the mixture in accordance with the principle of "backward return." The unliquefied residue, i. e., hydrogen, is delivered to the chamber 101 and escapes therefrom through a pipe 104.

The liquid accumulating in the chamber 98 is delivered therefrom through a pipe 105 having a pressure reducing valve 106 to the chamber 99 where is serves as a refrigerating agent for the gaseous mixture passing through the pipes 103. It is vaporized by heat interchange with the gaseous mixture and the vapor escapes through a pipe 107.

The extraneous liquid employed in the chamber 100 is produced in the lower part of the column 5 from the gas delivered to the chamber 97 through the pipe 18 from the column 5. This gas is substantially pure nitrogen, it being a portion of the residual unliquefied gas produced in the column 5. After entering the column 92, the gas in the chamber 97 passes upwardly in tubes 108 which are immersed in the liquid accumulated in the chamber 98, the nitrogen, being at a higher pressure than that upon the surrounding liquid, is liquefied by transfer of heat to the liquid and accumulates in the bottom of the chamber 97, the liquid being at the same time partially vaporized, and the vapor serving as a medium for the partial rectification of the liquid on the trays 102. The liquid accumulating in the chamber 97 is delivered by a pipe 109 having a pressure reducing valve 110 to the chamber 100, where it serves to liquefy substantially all of the constituents in the gaseous mixture flowing through the tubes 103 with the exception of the hydrogen. The extraneous liquid is vaporized by heat interchange with the gaseous mixture in the tubes 103 and the vapor escapes through a pipe 111. Thus it will be seen that the final refrigeration of the gaseous mixture in the tubes 103 is accomplished by means of a liquid, the temperature of which remains substantially constant throughout the operation.

The residual hydrogen from the column 92 is delivered by the pipe 104 to a chamber 112 at one end of the section C of the exchanger and travels through tubes 86 to a chamber 113 at the opposite end of the section C. A pipe 114 delivers the gas to a chamber 115 at one end of the section D of the exchanger. Thence the gas passes through tubes 86 to a chamber 116 at the opposite end of the section D, and the gas escapes through a pipe 117 controlled by a valve 118. Thus, the hydrogen in the exchanger may be delivered to a suitable receptacle for storage and is available immediately in a substantially pure condition.

The vapor from the chamber 99 is delivered through the pipe 107 to a chamber 119 at one end of the section C of the exchanger and travels thence through tubes 86 to a chamber 118' at the opposite end of the section C. A pipe 119' conveys the gas to a chamber 120 at one end of the section D of the exchanger and after traveling through the tubes 86, the gas arrives at a chamber 121 at the opposite end of the section D and is delivered through a pipe 122 to a suitable storage receptacle. This gas consisting substantially of carbon monoxide may be utilized as a fuel or for any suitable purpose, it having been brought to substantially atmospheric temperature in the exchanger.

Owing to heat leakage in the system, it is desirable to augment the cooling of the incoming water gas mixture in the exchanger sections C and D. The vapor from the chamber 100 of the column 92 which escapes through the pipe 111 is therefore delivered to a pipe 123 and an additional quantity of cold nitrogen is withdrawn from the pipe 44 through a pipe 124 and mixes with the vapor from the pipe 111. The cold gaseous nitrogen is delivered by the pipe 123 to a chamber 125 at one end of the section C of the exchanger and passes therein in tubes 85 to a chamber 126 at the opposite end of the section C. A pipe 127 delivers the gas to a chamber 128 at one end of the section D of the exchanger and the gas travels through tubes 85 to a chamber 129 at the opposite end of the section D. The gas escapes through a pipe 130 controlled by a valve 131 and may be conveyed to any suitable storage receptacle or delivered to the atmosphere.

From the foregoing, it will be observed that a complete and operative cycle is provided involving the production of water gas under conditions of maximum efficiency through the introduction of oxygen of relatively high purity to the producer. This eliminates substantially all of the nitrogen which ordinarily dilutes the water gas so that the gas is in excellent condition for separation by liquefaction to recover the hydrogen content thereof. The oxygen is produced in a simple and effective manner with minimum losses, the greater portion of the energy required to initially compress the air being recoverable from the expansion engines or turbines which at the same time insure the requisite refrigerative effect. The effluent from the air column is returned and recycled, so that all of the air entering the system is eventually separated with the oxygen recovered therefrom for use in the producer. The air column produces, moreover, the excess refrigerative effect required to maintain the water gas cycle in operation, and the separation of the water gas is efficiently accomplished by the final refrigeration of the gaseous mixture by indirect contact with a liquid which may be maintained at a substantially constant temperature. The method and apparatus herein described are adapted, therefore, to produce hydrogen for various purposes in an economical manner, and where large volumes of hydrogen of relatively high purity are required, the method and apparatus are particularly adapted to insure production of the hydrogen continuously, if desired, and in a condition well suited to its subsequent application.

Various changes may be made in the details of the method and in the apparatus illustrated and described without departing from the invention or sacrificing any of the advantages thereof.

I claim:

1. A method of producing hydrogen, which comprises subjecting a mass of ignited carbon to the action of a mixture of steam and oxygen, separating the constituents of the resulting gas by a liquefaction operation and simultaneously producing the oxygen and the refrigerating agent employed in separating the constituents of said gas by a separate liquefaction operation.

2. A method of producing hydrogen, which comprises separating oxygen from air by a liquefaction operation, subjecting a mass of ignited carbon to the action of a mixture of steam with the separated oxygen to produce water gas, liquefying and thereby separating the constituents of the water gas other than hydrogen, and maintaining the necessary low temperature to liquefy said constituents by excess refrigeration developed in the liquefaction operation to which the air is subjected.

3. A method of producing hydrogen, which comprises separating oxygen from air by a liquefaction operation, subjecting a mass of ignited carbon to the action of a mixture of steam with the separated oxygen to produce water gas, liquefying and thereby separating the constituents of the water gas other than hydrogen, and utilizing the cold nitrogen recovered in the liquefaction operation to which the air is subjected to maintain the necessary low temperature to liquefy the constituents of the water gas.

4. A method of producing hydrogen, which comprises separating oxygen from air by a liquefaction operation, subjecting a mass of ignited carbon to the action of a mixture of steam with the separated oxygen to produce water gas, liquefying and thereby separating the constituents of the water gas other than hydrogen, and subjecting the water gas prior to liquefaction to indirect contact with a product of the liquefaction operation to which the air is subjected.

5. A method of producing hydrogen, which comprises separating oxygen from air by a liquefaction operation, subjecting a mass of ignited carbon to the action of a mixture of steam with the separated oxygen to produce water gas, liquefying and thereby separating the constituents of the water gas other than hydrogen, and subjecting the water gas prior to liquefaction to indirect contact with cold nitrogen recovered in the liquefaction operation to which the air is subjected.

6. A method of producing hydrogen, which comprises separating oxygen from air by a liquefaction operation, subjecting a mass of ignited carbon to the action of a mixture of steam with the separated oxygen to produce water gas, liquefying and thereby separating the constituents of the water gas other than hydrogen, and utilizing a portion of the cold nitrogen separated from the air produced as an extraneous liquid to effect the final refrigeration of the water gas.

7. A method of producing hydrogen, which comprises separating oxygen from air by a liquefaction operation, subjecting a mass of ignited carbon to the action of a mixture of steam with the separated oxygen to produce water gas, liquefying and thereby separating the constituents of the water gas other than hydrogen, utilizing a portion of the cold nitrogen separated from the air produced as an extraneous liquid to effect the final refrigeration of the water gas, and employing another portion of the cold nitrogen to cool the water gas prior to liquefaction thereof.

8. A method of producing hydrogen, which comprises subjecting air to selective liquefaction to separate nitrogen therefrom and to produce a liquid enriched in oxygen, rectifying the liquid to produce a liquid rich in oxygen and an effluent gaseous mixture having substantially air composition, returning the gaseous effluent for further treatment in the liquefaction cycle, vaporizing the oxygen-containing liquid, subjecting a mass of ignited carbon to the action of a mixture of steam with the oxygen to produce water gas, liquefying and thereby separating the constituents of the water gas other than hydrogen, and maintaining the necessary low temperature to liquefy said constituents by transfer of cold thereto from the nitrogen separated from the air.

9. A method of producing hydrogen, which comprises subjecting air to selective liquefaction to separate nitrogen therefrom and to produce a liquid enriched in oxygen, rectifying the liquid to produce a liquid rich in oxygen and an effluent gaseous mixture having substantially air composition, returning the gaseous effluent for further treatment in the liquefaction cycle, vaporizing the oxygen-containing liquid, subjecting a mass of ignited carbon to the action of a mixture of steam with the oxygen to produce water gas, liquefying and thereby separating the constituents of the water gas other than hydrogen, expanding a portion of the nitrogen separated from the air to maintain the refrigerative effect required, and utilizing the balance of the nitrogen produced as an extraneous liquid for final refrigeration of the water gas.

10. A method of producing hydrogen, which comprises subjecting air to selective liquefaction to separate nitrogen therefrom and to produce a liquid enriched in oxygen, rectifying the liquid to produce a liquid rich in oxygen and an effluent gaseous mixture having substantially air composition, returning the gaseous effluent for further treatment in the liquefaction cycle, vaporizing the oxygen-containing liquid, subjecting a mass of ignited carbon to the action of a mixture of steam with the oxygen to produce water gas, liquefying and thereby separating the constituents of the water gas other than hydrogen, expanding a portion of the nitrogen separated from the air to maintain the refrigerative effect required, utilizing the balance of the nitrogen produced as an extraneous liquid for final refrigeration of the water gas, and cooling the water gas prior to liquefaction by indirect contact with the vapor from the extraneous liquid.

11. A method of producing hydrogen, which comprises subjecting air to selective liquefaction to separate nitrogen therefrom and to produce a liquid enriched in oxygen, rectifying the liquid to produce a liquid rich in oxygen and an effluent gaseous mixture having substantially air composition, returning the gaseous effluent for further treatment in the liquefaction cycle, vaporizing the oxygen-containing liquid, subjecting a mass of ignited carbon to the action of a mixture of steam with the oxygen to produce water gas, liquefying and thereby separating the constituents of the water gas other than hydrogen, expanding a portion of the nitrogen separated from the air to maintain the refrigerative effect required, utilizing the balance of the nitrogen produced as an extraneous liquid for final refrigeration of the water gas, and utilizing the vapor from the extraneous liquid in conjunction with the gaseous products of the separation to cool the water gas prior to such separation.

12. In an apparatus of the character described, the combination of a gas producer, means for separating a constituent of the gaseous product of the producer by the application of a refrigerating agent thereto and means operating to provide oxygen for use in the producer and the refrigerating agent simultaneously.

13. In an apparatus of the character described, the combination of a gas producer, means for separating a constituent of the gaseous product of the producer by the application of a refrigerating agent thereto and separate liquefaction means to recover oxygen for use in the producer and the refrigerating agent simultaneously.

14. In an apparatus of the character described, the combination of a gas producer, means for separating air into its principal constituents, oxygen and nitrogen, means for delivering the oxygen to the producer and means for subjecting the gaseous product of the producer to heat exchange with the nitrogen.

15. In an apparatus of the character described, the combination of a gas producer and means for supplying oxygen thereto including liquefaction means adapted to separate the oxygen from the atmosphere and to provide a refrigerating agent.

16. In an apparatus of the character described, the combination of a gas producer, means for supplying oxygen thereto including liquefaction means adapted to separate the oxygen from the atmosphere and to provide a refrigerating agent, and means for subjecting the gaseous product of the producer to heat exchange with the refrigerating agent.

17. In an apparatus of the character described, the combination of a gas producer, means for supplying oxygen thereto including liquefaction means adapted to separate the oxygen from the atmosphere and to provide a refrigerating agent, and means for subjecting the gaseous product of the producer to heat exchange with the refrigerating agent comprising a liquefier from which one of the constituents of the gaseous product is withdrawn as a residual gas.

18. In an apparatus of the character described, the combination of a gas producer, means for supplying oxygen thereto including liquefaction means adapted to separate the oxygen from the atmosphere and to provide a refrigerating agent, means for subjecting the gaseous product of the producer to heat exchange with the refrigerating agent comprising a liquefier from which one of the constituents of the gaseous product is withdrawn as a residual gas, and means for supplying the liquefier with the refrigerating agent in the liquid phase.

19. In an apparatus of the character described, the combination of a gas producer, means for supplying oxygen thereto including liquefaction means adapted to separate the oxygen from the atmosphere and to provide a refrigerating agent, and means for expanding a portion of the refrigerating agent to reduce the temperature thereof.

20. In an apparatus of the character described, the combination of a gas producer, means for partially liquefying the gaseous product of the producer by the application of a refrigerating agent to separate a constituent thereof in the gaseous phase, means for supplying oxygen to the producer and for providing simultaneously the refrigerating agent, and means for delivering a portion of the refrigerating agent to the liquefying means.

21. In an apparatus of the character described, the combination of a gas producer, means for partially liquefying the gaseous product of the producer by the application of a refrigerating agent to separate a constituent thereof in the gaseous phase, means for supplying oxygen to the producer and for providing simultaneously the refrigerating agent, means for delivering a portion of the refrigerating agent to the liquefying means and means for expanding the balance of the refrigerating agent.

In testimony whereof I affix my signature.

CLAUDE C. VAN NUYS.